(12) United States Patent
Inohiza

(10) Patent No.: US 12,218,787 B2
(45) Date of Patent: Feb. 4, 2025

(54) COMMUNICATION APPARATUS, INFORMATION PROCESSING APPARATUS, CONTROL METHOD, AND STORAGE MEDIUM

(71) Applicant: CANON KABUSHIKI KAISHA, Tokyo (JP)

(72) Inventor: Hirohiko Inohiza, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 388 days.

(21) Appl. No.: 17/458,089

(22) Filed: Aug. 26, 2021

(65) Prior Publication Data
US 2022/0052889 A1  Feb. 17, 2022

Related U.S. Application Data

(63) Continuation of application No. PCT/JP2020/005306, filed on Feb. 12, 2020.

(30) Foreign Application Priority Data

Feb. 28, 2019 (JP) .................. 2019-036701

(51) Int. Cl.
*H04L 27/26* (2006.01)
*H04L 5/00* (2006.01)
*H04W 84/12* (2009.01)

(52) U.S. Cl.
CPC ........ *H04L 27/2602* (2013.01); *H04L 5/0007* (2013.01); *H04W 84/12* (2013.01)

(58) Field of Classification Search
CPC . H04L 27/2602; H04L 5/0007; H04L 5/0053; H04W 84/12; H04W 16/28; H04B 7/0413; H04J 1/00
See application file for complete search history.

(56) References Cited

U.S. PATENT DOCUMENTS

| | | | |
|---|---|---|---|
| 2019/0058569 A1 | 2/2019 | Seok | |
| 2019/0116513 A1* | 4/2019 | Verma | H04W 74/002 |
| 2019/0349067 A1* | 11/2019 | Huang | H04B 17/309 |
| 2019/0373586 A1* | 12/2019 | Verma | H04W 72/51 |
| 2020/0112408 A1* | 4/2020 | Verma | H04B 7/0452 |

(Continued)

FOREIGN PATENT DOCUMENTS

JP  2018-050133 A  3/2018

OTHER PUBLICATIONS

"Draft Standard for Information Technology—Telecommunications and information exchange between systems Local and metropolitan area networks—Specific requirements"; IEEE 802.11ax /D3.0; Jul. 31, 2018.

(Continued)

*Primary Examiner* — Sharmin Chowdhury
(74) *Attorney, Agent, or Firm* — Canon U.S.A., Inc., IP Division

(57) ABSTRACT

A physical layer (PHY) that includes a Legacy Short Training Field (L-STF), a Legacy Long Training Field (L-LTF), a Legacy Signal Field (L-SIG), an Extremely High Throughput Signal A Field (EHT-SIG-A), an Extremely High Throughput Signal B Field (EHT-SIG-B) including a field of four or more bits indicating the number of Space-Time Streams, an EHT Short Training Field (EHT-STF), and an EHT Long Training Field (EHT-LTF) in this order is used.

15 Claims, 3 Drawing Sheets

(56) References Cited

U.S. PATENT DOCUMENTS

2021/0176643 A1* 6/2021 Jang ............... H04W 16/10
2021/0351820 A1* 11/2021 Huang ............. H04B 7/0413

OTHER PUBLICATIONS

Park, Eunsung et al.; "Overview of PHY Features for EHT"; doc.: IEEE 802.11-18/1967r0; Nov. 12, 2018.

Vermani, Sameer et al.; "16 Spatial Stream Support in Next Generation WLAN"; May 7, 2018.

Oteri, Kome et al.; "Technology Features for 802.11 EHT"; doc.: IEEE 802.11-18/1547r0; Sep. 7, 2018.

P802.1lax/D3.0, IEEE Draft Standard for Information Technology—Telecommunications and Information Exchange Between Systems Local and Metropolitan Area Networks—Specific Requirements Part II: Wireless LAN Mediun Access Control (MAC) and Physical Layer (PHY) Specifications Amendment Enhancements for High Efficiency WLAN, IEEE, <URL:https://ieeexplore,ieee.org/document/8424259> Jul. 2018.

Park, Eunsung et al., Overview of PHY Features for EHT, IEEE 802.11118/1967rO, IEEE,<URL:https://mentOr.ieee,org/802.H/dcn/18/11-18-1967-00-Oeht-overview-of-phy-features-for-cht.pptx,>Nov. 2018.

Vermani, Sameer et al., 16 Spatial Strean Support in Next Generation WLAN, IEEE 802.1, 18/0818r3, IEEE,<URL: https://mentor.ieee.org/802.11/dcn/18/11-18-0818-03-Owng-16-spatial-stream-support-in-next-generation-wlan.pptx> May 2018.

Oteri, Kome et al., Technology Features for 802.11 EHT, IEEE 802.1, 18/1547rO, IEEE, <URL:https://mentor.ieee.org/802.11/dcn/18/11-18-1547-00-Oeht-technology-features-for-802-11-eht.pptx>Sep. 2018.

Eunsung Park (LG Electronics), Overview of PHY Features for EHT, IEEE 802.11-18/1967r1, IEEE, URL:https://mentor.ieee.org/802.11/dcn/18/11-18-1967-01-0eht-overview-of-phy-features-for-eht.pptx > , Jan. 10, 2019.

IEEE P80211ax TM/D3.0 "Draft Standard for Information Technology—Telecommunications and Information Exchange Between Systems Local and Metropolitan Area Networks-Specific Requirements," Part 11: Wireless LAN Medium Access Control (MAC) and Physical Layer (PHY) Specifications, Amendment 6: Enhancements for High Efficiency WLAN, Jun. 2018, IEEE, Jul. 31, 2018, pp. 1, 423-435, 460-474, 477-479, 488-489, 490-492, 496, 509, 567-569, 572-573.

\* cited by examiner

COMMUNICATION APPARATUS, INFORMATION PROCESSING APPARATUS, CONTROL METHOD, AND STORAGE MEDIUM

CROSS-REFERENCE TO RELATED APPLICATIONS

This application is a Continuation of International Patent Application No. PCT/JP2020/005306, filed Feb. 12, 2020, which claims the benefit of Japanese Patent Application No. 2019-036701, filed Feb. 28, 2019, both of which are hereby incorporated by reference herein in their entirety.

BACKGROUND OF THE INVENTION

Field of the Invention

The present invention relates to an apparatus in compliance with the Institute of Electrical and Electronics Engineers (IEEE) 802.11 series standards.

Background Art

The IEEE 802.11 series standards are known as communication standards regarding a Wireless Local Area Network (wireless LAN). The IEEE 802.11ax standard achieves the improvement of the communication speed under a congested situation using Orthogonal Frequency-Division Multiple Access (OFDMA) (PLT 1). OFDMA is a technique that carries out one-to-many communication by dividing frequency resources and allocating them to each of a plurality of communication partner apparatuses. In such OFDMA communication, the peak throughput can be increased by further utilizing the Multi-Input Multi-Output (MIMO) technique, in which a plurality of spatial streams (Space-Time Streams) are generated using a plurality of antennas to carry out communication.

Currently, a Study Group called IEEE 802.11 Extremely High Throughput (EHT) is launched as a successor standard to the IEEE 802.11ax standard with the aim of further improvement of the throughput.

CITATION LIST

Patent Literature

PTL 1: Japanese Patent Laid-Open No. 2018-50133

A method currently under consideration as one of measures for the improvement of the throughput pursued by EHT is to increase the number of spatial streams used in the MIMO communication with each communication partner apparatus up to 16 when communicating with the plurality of communication partner apparatuses using OFDMA.

However, conventionally, there has been no physical layer (PHY) preamble structure capable of notifying the communication partner apparatuses that the number of spatial streams used in the communication with each communication partner apparatus is 9 or greater in the communication using OFDMA.

SUMMARY OF THE INVENTION

In consideration of the above-described problem, the present invention is directed to allowing a communication apparatus or an information processing apparatus to communicate information indicating that 9 or more streams are used in communication with communication partner apparatuses with which the apparatus communicates using OFDMA in a PHY frame.

According to an aspect of the present invention, a communication apparatus includes a transmission unit configured to transmit a first frame including a physical layer (PHY) preamble and a data field, wherein the PHY preamble includes a Legacy Short Training Field (L-STF), a Legacy Long Training Field (L-LTF), a Legacy Signal Field (L-SIG), an Extremely High Throughput (EHT) Signal A Field (EHT-SIG-A), an Extremely High Throughput (EHT) Signal B Field (EHT-SIG-B), an EHT Short Training Field (EHT-STF), and an EHT Long Training Field (EHT-LTF) in this order, wherein the EHT-SIG-B includes a field of four or more bits indicating the number of Space-Time Streams with respect to each of a plurality of communication partner apparatuses with which the communication apparatus communicates by Orthogonal Frequency-Division Multiple Access (OFDMA) using the first frame, and wherein the data field contains data to be transmitted to each of the plurality of communication partner apparatuses with as many streams as the number of Space-Time Streams.

According to another aspect of the present invention, a communication apparatus including a reception unit configured to receive a frame including a PHY preamble and a data field and a processing unit configured to process the frame received by the reception unit, wherein the PHY preamble includes a Legacy Short Training Field (L-STF), a Legacy Long Training Field (L-LTF), a Legacy Signal Field (L-SIG), an Extremely High Throughput (EHT) Signal A Field (EHT-SIG-A), an Extremely High Throughput (EHT) Signal B Field (EHT-SIG-B), an EHT Short Training Field (EHT-STF), and an EHT Long Training Field (EHT-LTF) in this order, wherein the EHT-SIG-B includes a field of four or more bits indicating the number of Space-Time Streams with respect to each of a plurality of communication partner apparatuses including the communication apparatus that carry out communication by Orthogonal Frequency-Division Multiple Access (OFDMA) using the frame, wherein the data field contains data to be transmitted to each of the plurality of communication partner apparatuses with as many streams as the number of Space-Time Streams, and wherein the processing unit processes the data contained in the data field and transmitted with the streams as many as the number of Space-Time Streams.

According to yet another aspect of the present invention, an information processing apparatus includes a generation unit configured to generate a frame including a PHY preamble and a data field, wherein the PHY preamble includes a Legacy Short Training Field (L-STF), a Legacy Long Training Field (L-LTF), a Legacy Signal Field (L-SIG), an Extremely High Throughput (EHT) Signal A Field (EHT-SIG-A), an Extremely High Throughput (EHT) Signal B Field (EHT-SIG-B), an EHT Short Training Field (EHT-STF), and an EHT Long Training Field (EHT-LTF) in this order, and wherein the EHT-SIG-B includes a field of four or more bits indicating the number of Space-Time Streams with respect to each of a plurality of communication partner apparatuses with which the information processing apparatus communicates by Orthogonal Frequency-Division Multiple Access (OFDMA) using the frame.

Further features of the present invention will become apparent from the following description of exemplary embodiments with reference to the attached drawings.

DESCRIPTION OF THE EMBODIMENTS

Figure 1:
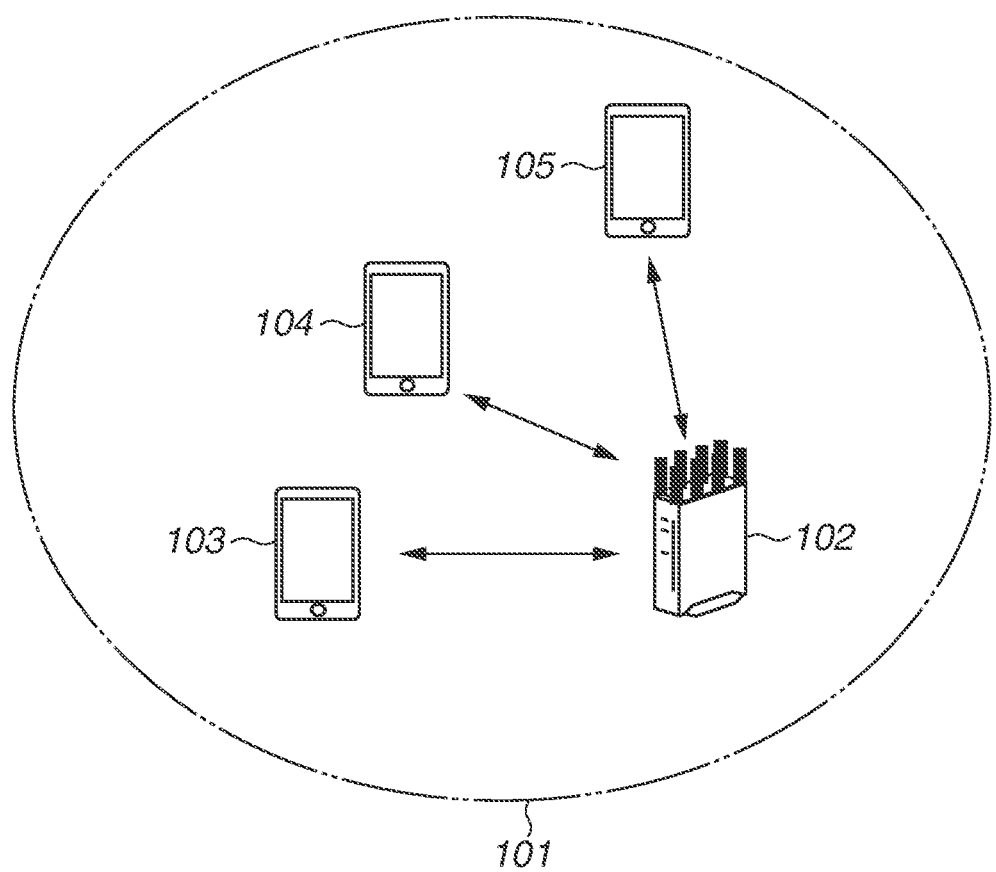
FIG. 1 illustrates a network configuration.

FIG. 1 illustrates an example of a network configuration according to an exemplary embodiment of the present invention. A wireless communication system illustrated in FIG. 1 is a wireless network including a base station 102, and a plurality of stations (hereinafter abbreviated as STAs) 103, 104, and 105. Here, the base station 102 is, for example, an Access Point (hereinafter abbreviates as an AP) in compliance with the Institute of Electrical and Electronics Engineers (IEEE) 802.11 series standards. However, the base station 102 is not limited thereto, and may be a Group Owner (hereinafter abbreviated as a GO) in compliance with the Wireless Fidelity (Wi-Fi) Direct standard. In the case where the base station 102 is a GO, the plurality of STAs 103 to 105 is also called Clients.

The base station 102 constructs a wireless network 101, and transmits a beacon containing identification information of the wireless network 101. Here, a dotted line illustrated as the wireless network 101 in FIG. 1 indicates a range where a signal transmitted from the base station 102 reaches, and the base station 102 can communicate with an STA located within the range indicated by this dotted line. Further, the base station 102 may have a relay function.

When receiving a Probe Request signal (a probe request) from an STA, the base station 102 transmits a Probe Response signal (a probe response) containing the identification information as a response. The identification information of the wireless network 101 is, for example, a Service Set Identifier (hereinafter abbreviated as an SSID).

Further, the base station 102 communicates with each of the STAs 103 to 105 according to a wireless communication method in compliance with the IEEE 802.11 Extremely High Throughput (EHT) standard. The base station 102 establishes a wireless link with each of the STAs 103 to 105 via a predetermined association process and the like.

The base station 102 and each of the STAs 103 to 105 can divide the frequency resources STA by STA to communicate with each other simultaneously by using Orthogonal Frequency-Division Multiple Access (OFDMA). By using OFDMA, the base station 102 carries out one-to-many communication by dividing the frequency resources and allocating them to a plurality of communication partner apparatuses (for example, the STAs 103 to 105).

Further, each of the base station 102 and the STAs 103 to 105 includes a plurality of antennas, and can transmit data at a high throughput using Multi-Input Multi-Output (MIMO) communication. For example, in a case where the base station 102 includes 20 antennas, the STA 103 includes 16 antennas, and the STA 104 includes 4 antennas, dividing the frequency resources of each of the STAs using OFDMA allows them to carry out MIMO communication with 16 streams and 4 streams simultaneously.

Here, MIMO is a technique for improving the use efficiency of channel resources by causing a plurality of antennas provided to a single communication apparatus or a plurality of communication apparatuses to use the same channel at the same time. In the present exemplary embodiment, communication using this MIMO technique will be referred to as MIMO communication.

Especially, the MIMO communication carried out between the base station 102 and one STA will be referred to as a single-user MIMO (Single User MIMO, hereinafter abbreviated as SU MIMO). On the other hand, the MIMO communication carried out between the base station 102 and a plurality of STAs will be referred to as multiple-user MIMO (Multi User MIMO, hereinafter abbreviated as MU MIMO).

Figure 2:
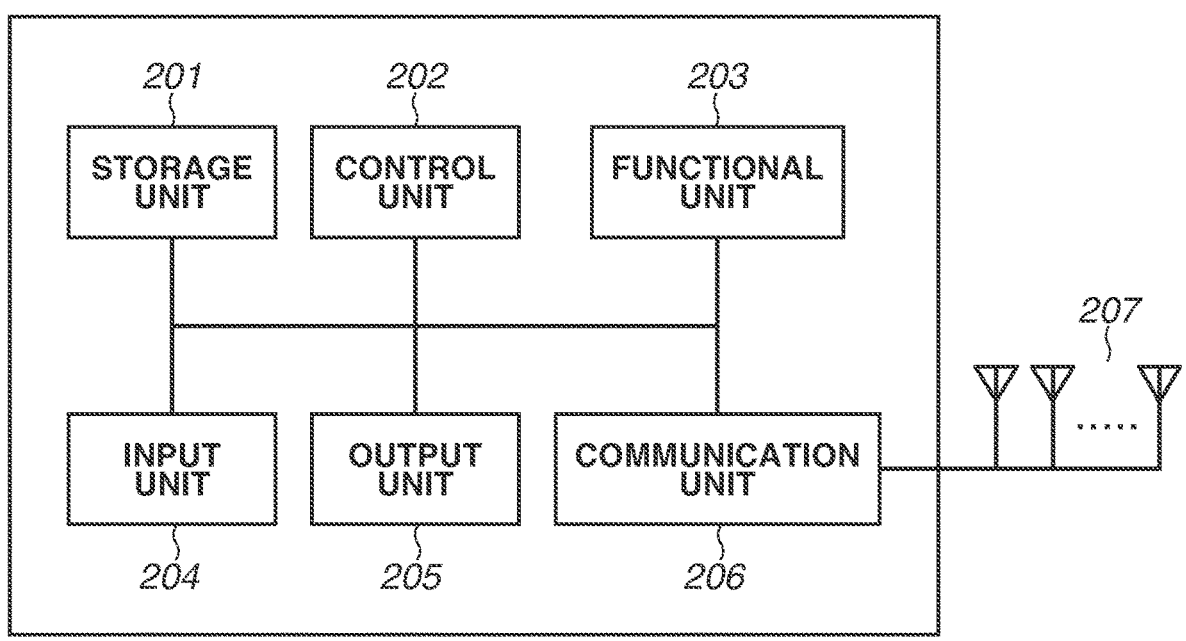
FIG. 2 illustrates a hardware configuration of a communication apparatus.

FIG. 2 illustrates the hardware configuration provided to each of the base station 102 and the STAs 103 to 105 (hereinafter collectively referred to as the communication apparatus). The communication apparatus includes a storage unit 201, a control unit 202, a functional unit 203, an input unit 204, an output unit 205, a communication unit 206, and a plurality of antennas 207.

The storage unit 201 includes one or more memories such as a read only memory (ROM) and a random access memory (RAM), and stores therein programs for performing various kinds of operations that will be described below and various kinds of information such as a communication parameter for wireless communication. Examples usable as the storage unit 201 include storage media such as a flexible disk, a hard disk, an optical disk, a magneto-optical disk, a compact disk (CD)-ROM, a CD recordable (CD-R), a magnetic tape, a nonvolatile memory card, and a digital versatile disk (DVD), besides the memory such as the ROM and the RAM. Further, the storage unit 201 may include a plurality of memories or the like.

The control unit 202 may be formed by one or more processor(s) such as a central processing unit (CPU) and a micro processing unit (MPU), an application specific integrated circuit (ASIC), a digital signal processor (DSP), a field programmable gate array (FPGA), and/or the like. The control unit 202 controls the communication apparatus by executing the program stored in the storage unit 201. The control unit 202 may be configured to control the communication apparatus based on a cooperation between a program stored in the storage unit 201 and an operating system (OS). Further, the control unit 202 may include a plurality of processors such as multi-core processors, and be configured to control the communication apparatus thereby.

Further, the control unit 202 controls the functional unit 203 to cause the functional unit 203 to execute a predetermined function. The predetermined function is, for example, an imaging function if the communication apparatus is a camera. Alternatively, the predetermined function is a printing function if the communication apparatus is a printer. Alternatively, the predetermined function is, for example, a projection function if the communication apparatus is a projector. The predetermined function is not limited thereto, and can be various functions. The functional unit 203 is hardware for executing this predetermined function.

The input unit 204 receives various kinds of operations from a user. The output unit 205 presents various kinds of outputs to the user. Here, the output by the output unit 205 includes at least one of a display on a screen, an audio output via a speaker, an output of a vibration, and the like. The communication apparatus may be configured to realize both the input unit 204 and the output unit 205 as one module, like a touch panel.

The communication unit 206 controls wireless communication in compliance with the IEEE 802.11 EHT standard, controls wireless communication in compliance with Wi-Fi, and controls Internet Protocol (IP) communication. Further, the communication unit 206 transmits and receives a wireless signal for wireless communication by controlling the antennas 207. The antennas 207 include 16 or more antennas to allow MIMO communication with 16 streams in compliance with the IEEE 802.11 EHT standard.

Figure 3:
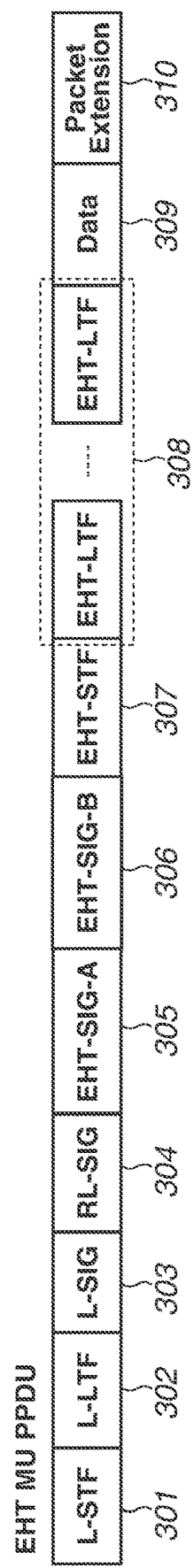
FIG. 3 illustrates a physical layer (PHY) frame of an Extremely High Throughput Multi User Physical layer Protocol Data Unit (EHT MU PPDU).

Next, a description will be given of a frame structure that the communication apparatus according to the present exemplary embodiment transmits and receives for the wireless communication in compliance with the IEEE 802.11 EHT standard with reference to FIG. 3. FIG. 3 illustrates the structure of a physical layer (PHY) frame of an EHT MU Physical layer Protocol Data Unit (PPDU) used when the MU MIMO communication is carried out. A physical layer will be referred to as a PHY for short.

A PHY preamble is placed at the beginning of the EHT MU PPDU. A Legacy Short Training Field (L-STF) 301, a Legacy Long Training Field (L-LTF) 302, and a Legacy Signal Field (L-SIG) 303 are placed in this order from the beginning in the PHY preamble to maintain backward compatibility with legacy devices. Now, the legacy devices refer to non-EHT devices (devices out of compliance with the EHT standard), i.e., devices in compliance with any standard among IEEE 802.11a, b, g, n, ac, and ax.

Further, L-STF is used for, for example, detection of a PHY frame signal, automatic gain control (AGC), and timing detection.

The L-LTF 302 is placed immediately after the L-STF 301. L-LTF is used to, for example, highly accurately synchronize a frequency and time and acquire propagation channel information (Channel State Information (CSI)).

The L-SIG 303 is placed immediately after the L-LTF 302. L-SIG is used to, for example, transmit control information including information indicating a data transmission rate and a PHY frame length.

The above-described various kinds of legacy fields (the L-STF 301, the L-LTF 302, and the L-SIG 303) share a common structure with the frames of IEEE 802.11a, b, g, n, ac, and ax. Due to this structure, the legacy devices can decode data in the above-described various kinds of legacy fields.

An EHT Signal A Field (EHT-SIG-A) 305 is placed immediately after the L-SIG 303. EHT-SIG-A includes an EHT-SIG-A1 and an EHT-SIG-A2 in this order. The EHT-SIG-A1 and the EHT-SIG-A2 contain information indicated in a table 1 and information indicated in a table 2, respectively. These pieces of information are used in processing for receiving the EHT MU PPDU.

The PHY frame may be configured to include a Repeated L-SIG (RL-SIG) 304 between the L-SIG 303 and the EHT-SIG-A 305. The RL-SIG 304 is a field containing the same content as the L-SIG 303.

TABLE 1

| | Bit Position | Subfield | Number of Bits | Description |
|---|---|---|---|---|
| EHT-SIG-A1 | B0 | Uplink (UL)/Downlink (DL) | 1 | Indicates whether the PPDU is transmitted for UL or DL. Set to the same value as TXVECTOR UPLINK_FLAG. |
| | B1-B3 | SIGB Modulation and Coding Scheme (MCS) | 3 | Indicates the MCS of the EHT-SIG-B field. Set to 0 for MCS 0. Set to 1 for MCS 1. Set to 2 for MCS 2. Set to 3 for MCS 3. Set to 4 for MCS 4. Set to 5 for MCS 5. The values 6 and 7 are reserved areas. |
| | B4 | SIGB Dual Carrier Modulation (DCM) | 1 | Set to 1 when the EHT-SIG-B field is modulated with DCM. |
| | B5-B10 | Basic Service Set (BSS) Color | 6 | A value of 6 bits for identifying the BSS. |
| | B11-B14 | Spatial Reuse | 4 | Indicates whether Spatial Reuse is permitted during the transmission of this PPDU. Set to the value of Spatial Reuse field encoding indicated in another table. |
| | B15-B17 | Bandwidth | 3 | Set to 0 for 20 MHz. Set to 1 for 40 MHz. Set to 2 for 80 MHz. Set to 3 for 160 MHz (80 + 80 MHz). When the SIGB Compression field is 0: set to 4 when only secondary 20 MHz is punctured in preamble puncturing in 80 MHz; set to 5 when two 20 MHz subchannels in secondary 40 MHz are punctured in preamble puncturing in 80 MHz; set to 6 when only secondary 20 MHz is punctured in preamble puncturing in 160 (or 80 + 80) MHz; and set to 7 when only secondary 40 MHz is punctured in preamble puncturing in 160 (or 80 + 80) MHz. |

TABLE 1-continued

| Bit Position | Subfield | Number of Bits | Description |
|---|---|---|---|
| B18-B21 | Number of EHT-SIG-B Symbols or MU-MIMO Users | 4 | When the SIGB field is 1, the values 4 to 7 mean being reserved. Indicates the number of OFDMA symbols in the EHT-SIG-B when the SIGB Compression field is 0. Set to the number of OFDM symbols in the EHT-SIG-B minus 1 when the number of OFDM symbols in the EHT-SIG-B is smaller than 16. Set to 15 to indicate that the number of OFDM symbols in the EHT-SIG-B is 16 when the capability of supporting the number of EHT SIG-B OFDM symbols greater than 16 is set to 0 in at least one recipient terminal. Set to 15 to indicate that the number of OFDM symbols in the EHT-SIG-B is 16 or greater when the capability of supporting the number of EHT SIG-B OFDM symbols greater than 16 is set to 0 in all the recipient terminals and the EHT-SIG-B data rate is lower than MCS 4 not using DCM. When the SIGB Compression field is 1, this means the number of MU-MIMO users minus 1. |
| B22 | SIG Compression | 1 | Set to 1 when the Common field is present in the EHT-SIG-B. |
| B23-B24 | Guard Interval 2 (GI) + LTF Size | | Indicates the Guard Interval duration and the EHT-LTF size. Set to 0 for 4x EHT-LTF and 0.8 µs GI. Set to 1 for 2x EHT-LTF and 0.8 µs GI. Set to 2 for 2x EHT-LTF and 1.6 µs GI. Set to 3 for 4x EHT-LTF and 3.2 µs GI. |
| B25 | Doppler | 1 | Set to 1 when any of the following conditions is satisfied: the number of OFDM symbols in the data field is greater than a "value indicated by the midamble periodicity + 1" and the midamble is present, and the number of OFDM symbols in the data field is equal to or smaller than the "value indicated by the midamble periodicity + 1", the midamble is not present, and the channel is varying fast. |

TABLE 2

| | Bit Position | Subfield | Number of Bits | Description |
|---|---|---|---|---|
| EHT-SIG-A2 | B0-B6 | TXOP | 7 | Transmission Opportunity. Set to 127 when TXOP_DURATION of TX VECTOR is set to UNSPECIFIED and no duration information is present. Set to a value smaller than 127 to set Network Allocation Vector (NAV) when TXOP_DURATION of TXVECTOR is smaller than 512. |

TABLE 2-continued

| Bit Position | Subfield | Number of Bits | Description |
|---|---|---|---|
| | | | In this case, B1-B6 are set to floor (round-down) of TXOP_DURATION/8 when B0 is 0. B1-B6 are set to floor of (TXOP_DURATION − 512)/8 when B0 is 1. |
| B7 | Reserved | 1 | Reserved area. |
| B8-B10 | Number of EHT-LTF Symbols and Midamble Periodicity | 3 | Indicates the number of EHT-LTF symbols. Set to 0 for 1 EHT-LTF symbol. Set to 1 for 2 EHT-LTF symbols. Set to 2 for 4 EHT-LTF symbols. Set to 3 for 6 EHT-LTF symbols. Set to 4 for 8 EHT-LTF symbols. When the Doppler field is 1, B8-B9 indicate the number of EHT-LTF symbols and B10 indicates the midamble periodicity. |
| B11 | Low Density Parity Check (LDPC) Extra Symbol Segment | 1 | Indicates whether the extra OFDM symbol segment for LDPC is present. |
| B12 | Space Time Block Coding (STBC) | 1 | When the number of users of each Resource Unit (RU) is not greater than 1, set to 1 to indicate that the RU is encoded by STBC. |
| B13-B14 | Pre-Forward Error Correction (FEC) Padding Factor | 2 | Set to 0, 1, 2, and 3 when the pre-FEC padding factor is 4, 1, 2, and 3, respectively. |
| B15 | Packet Extension (PE) Disambiguity | 1 | Packet Extension Disambiguity field |
| B16-B19 | Cyclic Redundancy Check (CRC) | 4 | CRC for the EHT-SIG-A (total 41 bits of 26 bits in A1 and 16 bits until B15 in A2) field so far. |
| B20-B25 | Tail | 6 | Set to 0 to indicate termination to the trellis convolutional decoder. |

An EHT Signal B Field (EHT-SIG-B) 306 is placed immediately after the EHT-SIG-A 305, more specifically, immediately after the EHT-SIG-A2. The EHT-SIG-B 306 contains information indicated in a table 3. This information is used in the processing for receiving the EHT MU PPDU.

TABLE 3

| | Subfield | Number of Bits | Description |
|---|---|---|---|
| Common field | RU Allocation | N × 8 | Indicates the RU allocation to be used in the data portion on the frequency axis. N = 1 for allocation of a 20 MHz and a 40 MHz EHT MU PPDU. N = 2 for allocation of an 80 MHz EHT MU PPDU. N = 4 for allocation of a 160 MHz or 80 + 80 MHz EHT MU PPDU. |
| | Center 26-tone RU | 1 | This field is used only when the Bandwidth field of the EHT-SIG-A field in the EHT MU PPDU is greater than 1 (80 MHz or higher). Indicates whether the center 26-tone RU is used. |
| | CRC | 4 | A CRC computed value. |
| | Tail | 6 | Trailer bits. Set to 0. |
| User Block field | User field | N × 22 | |
| | CRC | 4 | A CRC computed value. |
| | Tail | 6 | Tailer bits. Set to 0. |

The EHT-SIG-B 306 includes a Common Field, which is common information shared by all the STAs, and a User Block Field, which is information addressed to each of the plurality of STAs that are the communication partner apparatuses to which this EHT MU PPDU is transmitted. The EHT-SIG-B 306 includes as many User Block Fields as the number of the plurality of STAs that are the communication partner apparatuses to which this EHT MU PPDU is transmitted. The User Block Field further includes a User Field. The User Field contains information indicated in a table 4.

TABLE 4

| | Subfield | Number of Bits | Description |
|---|---|---|---|
| User field | STA-Identification (ID) | 11 | The ID of an STA or an STA group that is a recipient of the RU of the EHT MU PPDU. |
| | Number of Space-Time Streams (NSTS) | 4 | The number of Space-Time Streams − 1. |
| | Tx Beamforming | 1 | Set to 1 when Transmission Beamforming is used. Set to 0 otherwise. |
| | MCS | 4 | A value of Modulation and Coding Scheme. |

TABLE 4-continued

| Subfield | Number of Bits | Description |
|---|---|---|
| DCM | 1 | Indicates whether Dual Carrier Modulation is applied to the data field. |
| Coding | 1 | Set to 0 for Binary Convolutional Code (BCC). Set to 1 for Low Density Parity Check (LDPC). |

An NSTS field of four bits is contained in the User Field in the User Block Field. The NSTS field stores information indicating the number of Space-Time Streams (SS) used in the MIMO communication with the STA corresponding to this User Block Field, i.e., the number of streams. A value acquired by subtracting 1 from the actual number of streams is stored in this field. More specifically, for example, "0" is stored in all of the four bits to indicate 1 stream. Further, for example, "1" is stored in all of the four bits to indicate 16 streams. The number of streams from 1 to 16 can be set in this manner.

Further, four bits are allocated to the NSTS field in the present exemplary embodiment, and this allows the NSTS field to indicate up to 16 as the number of streams. However, the NSTS field may be configured to indicate a greater number of streams than 16 by allocating five or more bits, in further preparation for possible extension in a successor standard to the IEEE 802.11 EHT standard. In this manner, 9 or a greater number can be indicated as the number of streams by allocating four or more bits to the NSTS field.

An EHT Short Training Field (EHT-STF) 307 is placed immediately after the EHT-SIG-B 306 containing such information about the number of streams. EHT-STF is used to improve the automatic gain control in the MIMO communication.

Then, an EHT Long Training Field (EHT-LTF) 308 is placed immediately after the EHT-STF 307. EHT-LTF is used to estimate the channel in the MIMO communication.

A data field 309 is placed immediately after the EHT-LTF 308. A Packet Extension 310, which is an extended field, may be placed immediately after the data field 309. The data field 309 contains pieces of MIMO communication data transmitted with the number of streams indicated in the NSTS field in the EHT-SIG-B 306 as many as the number of the plurality of STAs. In this manner, data addressed to the plurality of communication partner apparatuses is transmitted in the data field 309 by utilizing MIMO and OFDMA.

Upon receiving the EHT MU PPDU, each of the STAs recognizes the number of streams based on an NSTS And Midamble Periodicity field in the EHT-SIG-A1. Then, each of the STAs performs processing according to the recognized number of streams, thereby performing processing for receiving the MIMO communication data transmitted with, for example, 16 streams.

Next, a description will be given of the operation of the communication apparatus when these frames are transmitted or received. When the base station 102 transmits the EHT MU PPDU, the control unit 202 of the base station 102 generates data to be contained in the data field 309. This data includes the data addressed to each of the STAs 103 to 105. This generation is realized by the control unit 202 reading out the program stored in the storage unit 201 of the base station 102 and executing it. Then, a frame containing the data and including the above-described PHY preamble is generated by the control unit 202, the communication unit 206, or cooperation of them. Then, the communication unit 206 transmits the generated frame via the antennas 207.

On the other hand, the communication unit 206 of each of the STAs 103 to 105 receives the EHT MU PPDU having the above-described frame structure from the base station 102. Then, the control unit 202 or the communication unit 206 of each of the STAs 103 to 105 identifies the User Block Field addressed to the apparatus itself that is contained in the EHT-SIG-B in the PHY preamble. Further, the control unit 202 or the communication unit 206 of each of the STAs 103 to 105 recognizes the number of streams for the data field by referring to the NSTS field included in this User Block Field. Then, the communication unit 206 of each of the STAs 103 to 105 performs the processing according to the recognized number of streams, thereby performing the processing for receiving the MIMO communication data transmitted with, for example, 16 streams. Then, the control unit 202 acquires the data acquired by the reception processing from the communication unit 206. The control unit 202 of each of the STAs 103 to 105 performs various kinds of control such as output control (for example, display or printing of the data) based on the data acquired in such a manner.

The present exemplary embodiment can also be implemented on an information processing apparatus (for example, a chip) that generates the above-described PHY preamble, besides the base station 102 and the STAs 103 to 105, each of which is the communication apparatus. In this case, desirably, this information processing apparatus is connectable to a plurality of antennas.

Using this frame structure of the EHT MU PPDU allows the communication apparatus or the information processing apparatus to communicate the fact that the number of spatial streams used in the communication with each of the plurality of communication partner apparatuses using OFDMA is 9 or greater in the PHY frame. EHT has been described as being an abbreviation for Extremely High Throughput in the above description, but may be interpreted as being an abbreviation for Extreme High Throughput.

Further, a PHY preamble in an EHT SU PPDU, which is a PPDU used in the SU MIMO communication, may be configured not to include the EHT-SIG-B therein. More specifically, when the base station 102 transmits the EHT SU PPDU, the legacy fields and the EHT-SIG-A are included in the PHY preamble in the EHT SU PPDU, but the EHT-SIG-B is not included therein. Further, a PHY preamble in the beacon and the Probe Response signal transmitted from the base station 102 may be configured not to include both the EHT-SIG-A and the EHT-SIG-B. In this manner, the base station 102 can also switch whether to place the EHT-SIG-B according to a signal to transmit.

The present invention can also be embodied by processing that supplies a program capable of fulfilling one or more functions of the above-described exemplary embodiment to a system or an apparatus via a network or a storage medium, and causes one or more processors in a computer of the system or apparatus to read out and execute the program. Further, the present invention can also be embodied by a circuit (for example, an ASIC) capable of fulfilling one or more functions.

The present invention is not limited to the above-described exemplary embodiment, and can be changed and modified in various manners without departing from the spirit and the scope of the present invention. Therefore, the following claims are attached to make the scope of the present invention public.

According to the present invention, the communication apparatus or the information processing apparatus can communicate information indicating that 9 or more streams are used in the communication with the communication partner apparatuses with which the apparatus communicates using OFDMA in the PHY frame.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising: at least one memory that stores a set of instructions; and
at least one processor,
wherein the communication apparatus is caused, by the at least one processor executing the instructions, to perform operations comprising:
generating an Extremely High Throughput Multi User Physical layer Protocol Data Unit (EHT MU PPDU) in compliance with Institute of Electrical and Electronics Engineers (IEEE) 802.11 series standards including a preamble and a data field; and
transmitting the generated EHT MU PPDU,
wherein the preamble includes:
a Legacy Short Training Field (L-STF),
a Legacy Long Training Field (L-LTF),
a Legacy Signal Field (L-SIG),
a second Signal Field, a third Signal Field,
an EHT Short Training Field (EHT-STF), and
an EHT Long Training Field (EHT-LTF) in this order,
wherein the second Signal Field includes a subfield of 1 bit indicating whether the EHT MU PPDU is for Uplink (UL) or for Downlink (DL), a subfield indicating Modulation and Coding Scheme (MCS) of the third Signal Field, a subfield of 3 bits indicating information related to a bandwidth, and a subfield of 7 bits indicating information related to Transmission Opportunity (TXOP),
wherein the third Signal Field includes a Common field and a User field,
wherein the Common field includes a subfield indicating information related to Resource Unit (RU) Allocation, a subfield of 4 bits indicating a CRC computed value, and a subfield of 6 bits indicating a Tail,
wherein the user field includes 22 bits, including a subfield of four bits to which a value is set, the value being obtained by subtracting 1 from a number of Space-Time Streams to be used for communication only with one communication partner apparatus corresponding to the User field among a plurality of communication partner apparatuses with which the communication apparatus communicates by Orthogonal Frequency-Division Multiple Access (OFDMA) using the EHT MU PPDU,
wherein the data field contains data to be transmitted to the one communication partner apparatus corresponding to the User field among the plurality of communication partner apparatuses, the data being transmitted with as many streams as the number of Space-Time Streams, and
wherein, in a case where each bit of the subfield of four bits is zero, the number of Space-Time Streams is one.

2. The communication apparatus according to claim 1, wherein the preamble further includes a Repeated Legacy Signal Field (RL-SIG) between the L-SIG and the second Signal Field.

3. The communication apparatus according to claim 1, further comprising a plurality of antennas, wherein the EHT MU PPDU is transmitted via the plurality of antennas.

4. The communication apparatus according to claim 1, wherein information indicating 16 as the number of Space-Time Streams is stored in the subfield of 4 bits included in the User field in the third Signal Field.

5. The communication apparatus according to claim 1, wherein the subfield of 4 bits included in the User field is four contiguous bits.

6. The communication apparatus according to claim 1, wherein the User field includes a subfield of 11 bits indicating a communication partner apparatus to which an RU of the EHT MU PPDU is assigned.

7. A communication apparatus comprising: at least one memory that stores a set of instructions; and
at least one processor,
wherein the communication apparatus is caused, by the at least one processor executing the instructions, to perform operations comprising:
receiving from another communication apparatus an Extremely High Throughput Multi User Physical layer Protocol Data Unit (EHT MU PPDU) in compliance with Institute of Electrical and Electronics Engineers (IEEE) 802.11 series standards including a preamble and a data field; and
obtaining data included in the data field based on information included in the preamble,
wherein the preamble includes;
a Legacy Short Training Field (L-STF),
a Legacy Long Training Field (L-LTF),
a Legacy Signal Field (L-SIG),
a second Signal Field,
a third Signal Field,
an EHT Short Training Field (EHT-STF), and
an EHT Long Training Field (EHT-LTF) in this order,
wherein the second Signal Field includes a subfield of 1 bit indicating whether the EHT MU PPDU is for Uplink (UL) or for Downlink (DL), a subfield indicating Modulation and Coding Scheme (MCS) of the third Signal Field, a subfield of 3 bits indicating information related to a bandwidth, and a subfield of 7 bits indicating information related to Transmission Opportunity (TXOP),
wherein the third Signal Field includes a Common field and a User field,
wherein the Common field includes a subfield indicating information related to Resource Unit (RU) Allocation, a subfield of 4 bits indicating a CRC computed value, and a subfield of 6 bits indicating a Tail,
wherein the user field includes 22 bits, including a subfield of 4 bits to which a value is set, the value being obtained by subtracting 1 from a number of Space-Time Streams to be used for communication only with one communication apparatus corresponding to the User field among a plurality of communication apparatuses including the communication apparatus that carries out communication by Orthogonal Frequency-Division Multiple Access (OFDMA) using the EHT MU PPDU,
wherein the data field contains data to be received by the one communication apparatus corresponding to the User field among the plurality of communication apparatuses, the data being received with as many streams as the number of Space-Time Streams, and wherein, in a case where each bit of the subfield of four bits is zero, the number of Space-Time Streams is one.

8. The communication apparatus according to claim 7, further comprising a plurality of antennas, wherein the EHT MU PPDU is received via the plurality of antennas.

9. The communication apparatus according to claim 7, wherein the subfield of 4 bits included in the User field is four contiguous bits.

10. The communication apparatus according to claim 7, wherein the User field includes a subfield of 11 bits indicating a communication apparatus to which an RU of the EHT MU PPDU is assigned.

11. An information processing apparatus comprising: at least one memory that stores a set of instructions; and at least one processor, wherein the information processing communication apparatus is caused, by the at least one processor executing the instructions, to perform operations comprising:

generating an Extremely High Throughput Multi User Physical layer Protocol Data Unit (EHT MU PPDU) in compliance with Institute of Electrical and Electronics Engineers (IEEE) 802.11 series standards including a preamble and a data field; and transmitting the generated EHT MU PPDU, wherein the preamble includes:

a Legacy Short Training Field (L-STF),
a Legacy Long Training Field (L-LTF),
a Legacy Signal Field (L-SIG),
a second Signal Field,
a third Signal Field,
an EHT Short Training Field (EHT-STF), and
an EHT Long Training Field (EHT-LTF) in this order, wherein the second Signal Field includes a subfield of 1 bit indicating whether the EHT MU PPDU is for Uplink (UL) or for Downlink (DL), a subfield indicating Modulation and Coding Scheme (MCS) of the third Signal Field, a subfield of 3 bits indicating information related to a bandwidth, and a subfield of 7 bits indicating information related to Transmission Opportunity (TXOP), wherein the third Signal Field includes a Common field and a User field, wherein the Common field includes a subfield indicating information related to Resource Unit (RU) Allocation, a subfield of 4 bits indicating a CRC computed value, and a subfield of 6 bits indicating a Tail, wherein the user field includes 22 bits, including subfield of four bits indicating to which a value is set, the value being obtained by subtracting 1 from a number of Space-Time Streams to be used for communication only with one communication partner apparatus corresponding to the User field among a plurality of communication partner apparatuses with which the information processing apparatus communicates by Orthogonal Frequency-Division Multiple Access (OFDMA) using the EHT MU PPDU, and wherein, in a case where each bit of the subfield of four bits is zero, the number of Space-Time Streams is one.

12. A method for controlling a communication apparatus, the method comprising:

generating an Extremely High Throughput Multi User Physical layer Protocol Data Unit (EHT MU PPDU) in compliance with Institute of Electrical and Electronics Engineers (IEEE) 802.11 series standards including a preamble and a data field; and transmitting the generated EHT MU PPDU, wherein the preamble includes:

a Legacy Short Training Field (L-STF),
a Legacy Long Training Field (L-LTF),
a Legacy Signal Field (L-SIG),
a second Signal Field,
a third Signal Field,
an EHT Short Training Field (EHT-STF), and
an EHT Long Training Field (EHT-LTF) in this order, wherein the second Signal Field includes a subfield of 1 bit indicating whether the EHT MU PPDU is for Uplink (UL) or for Downlink (DL), a subfield indicating Modulation and Coding Scheme (MCS) of the third Signal Field, a subfield of 3 bits indicating information related to a bandwidth, and a subfield of 7 bits indicating information related to Transmission Opportunity (TXOP), wherein the third Signal Field includes a Common field and a User field, wherein the Common field includes a subfield indicating information related to Resource Unit (RU) Allocation, a subfield of 4 bits indicating a CRC computed value, and a subfield of 6 bits indicating a Tail, wherein the user field includes 22 bits, including subfield of four bits to which a value is set, the value being obtained by subtracting 1 from a number of Space-Time Streams to be used for communication only with one communication partner apparatus corresponding to the User field among a plurality of communication partner apparatuses with which the communication apparatus communicates by Orthogonal Frequency-Division Multiple Access (OFDMA) using the EHT MU PPDU, wherein the data field contains data to be transmitted to the one communication partner apparatus corresponding to the User field among the plurality of communication partner apparatuses, the data being transmitted with as many streams as the number of Space-Time Streams, and wherein, in a case where each bit of the subfield of four bits is zero, the number of Space-Time Streams is one.

13. A method for controlling a communication apparatus, the method comprising:

receiving from another communication apparatus an Extremely High Throughput Multi User Physical layer Protocol Data Unit (EHT MU PPDU) in compliance with Institute of Electrical and Electronics Engineers (IEEE) 802.11 series standards including a preamble and a data field, and obtaining data included in the data field based on information included in the preamble, wherein the preamble includes:

a Legacy Short Training Field (L-STF),
a Legacy Long Training Field (L-LTF),
a Legacy Signal Field (L-SIG),
a second Signal Field,
a third Signal Field,
an EHT Short Training Field (EHT-STF), and
an EHT Long Training Field (EHT-LTF) in this order, wherein the second Signal Field includes a subfield of 1 bit indicating whether EHT MU PPDU is for Uplink (UL) or for Downlink (DL), a subfield indicating Modulation and Coding Scheme (MCS) of the third Signal Field, a subfield of 3 bits indicating information related to a bandwidth, and a subfield of 7 bits indicating information related to Transmission Opportunity (TXOP), wherein the third Signal Field includes a Common field and a User field, wherein the Common field includes a subfield indicating information related to Resource Unit (RU) Allocation, a subfield of 4 bits indicating a CRC computed value, and a subfield of 6 bits indicating a Tail, wherein the user field includes 22 bits, including subfield of four bits indicating to which a value is set, the value being obtained by subtracting 1 from a number of Space-Time Streams to be used for communication only with one communication apparatus corresponding to the User field among a plurality of communication apparatuses including the communication apparatus that carries out communication by Orthogonal Frequency-Division Multiple Access (OFDMA) using the EHT MU PPDU, anti wherein the data field contains data to be received by the one communication apparatus corresponding to the User field among the plurality of communication apparatuses, the data being received with as many streams as the number of Space-Time Streams, and wherein, in a case where each bit of the subfield of four bits is zero, the number of Space-Time Streams is one.

14. A method for controlling an information processing apparatus, the method comprising:

generating an Extremely High Throughput Multi User Physical layer Protocol Data Unit (EHT MU PPDU) in compliance with Institute of Electrical and Electronics Engineers (IEEE) 802.11 series standards including a preamble and a data field; and transmitting the generated EHT MU PPDU, wherein the preamble includes:

a Legacy Short Training Field (L-STF), a Legacy Long Training Field (L-LTF), a Legacy Signal Field (L-SIG), a second Signal Field, a third Signal Field, an EHT Short Training Field (EHT-STF), and an EHT Long Training Field (EHT-LTF) in this order, wherein the second Signal Field includes a subfield of 1 bit indicating whether the EHT MU PPDU is for Uplink (UL) or for Downlink (DL), a subfield indicating Modulation and Coding Scheme (MCS) of the third Signal Field, a subfield of 3 bits indicating information related to a bandwidth, and a subfield of 7 bits indicating information related to Transmission Opportunity (TXOP), wherein the third Signal Field includes a Common field and a User field, wherein the Common field includes a subfield indicating information related to Resource Unit (RU) Allocation, a subfield of 4 bits indicating a CRC computed value, and a subfield of 6 bits indicating a Tail, wherein the user field includes 22 bits, including subfield of four bits indicating to which a value is set, the value being obtained by subtracting 1 from a number of Space-Time Streams to be used for communication only with one communication partner apparatus corresponding to the User field among a plurality of communication partner apparatuses with which the information processing apparatus communicates by Orthogonal Frequency-Division Multiple Access (OFDMA) using the EHT MU PPDU, and wherein, in a case where each bit of the subfield of four bits is zero, the number of Space-Time Streams is one.

15. A non-transitory computer readable storage medium storing a program for causing a computer at a communication apparatus to perform a process, the process comprising:

generating an Extremely High Throughput Multi User Physical layer Protocol Data Unit (EHT MU PPDU) in compliance with Institute of Electrical and Electronics Engineers (IEEE) 802.11 series standards including a preamble and a data field; and transmitting the generated EHT MU PPDU, wherein the preamble includes:

a Legacy Short Training Field (L-STF), a Legacy Long Training Field (L-LTF), a Legacy Signal Field (L-SIG), a second Signal Field, a third Signal Field, an EHT Short Training Field (EHT-STF), and an EHT Long Training Field (EHT-LTF) in this order, wherein the second Signal Field includes a subfield of 1 bit indicating whether the EHT MU PPDU is for Uplink (UL) or for Downlink (DL), a subfield indicating Modulation and Coding Scheme (MCS) of the third Signal Field, a subfield of 3 bits indicating information related to a bandwidth, and a subfield of 7 bits indicating information related to Transmission Opportunity (TXOP), wherein the third Signal Field includes a Common field and a User field, wherein the Common field includes a subfield indicating information related to Resource Unit (RU) Allocation, a subfield of 4 bits indicating a CRC computed value, and a subfield of 6 bits indicating a Tail, wherein the user field includes 22 bits, including subfield of four bits indicating to which a value is set, the value being obtained by subtracting 1 from a number of Space-Time Streams to be used for communication only with one communication partner apparatus corresponding to the User field among a plurality of communication partner apparatuses with which the communication apparatus communicates by Orthogonal Frequency-Division Multiple Access (OFDMA) using the EHT MU PPDU, wherein the data field contains data to be transmitted to the one communication partner apparatus corresponding to the User field among the plurality of communication partner apparatuses, the data being transmitted with as many streams as the number of Space-Time Streams, and wherein, in a case where each bit of the subfield of four bits is zero, the number of Space-Time Streams is one.

* * * * *